United States Patent [19]

Henderson et al.

[11] 4,091,162

[45] May 23, 1978

[54] ADHESIVES

[75] Inventors: Neil Kirkpatrick Henderson, West Kilbride; Eric Thomson, Bridge of Weir, both of England

[73] Assignee: Smith & McLaurin Limited, Cartside Mills, Millikenpark, Great Britain

[21] Appl. No.: 673,418

[22] Filed: Apr. 5, 1976

[30] Foreign Application Priority Data

Apr. 4, 1975 United Kingdom ............... 13868/75

[51] Int. Cl.$^2$ .......................... B32B 5/16; B32B 27/14
[52] U.S. Cl. .................................. 428/327; 427/222; 427/385 R; 428/307; 428/407

[58] Field of Search ............... 428/403, 404, 407, 306, 428/307, 349, 347, 346, 343, 355, 327, 40; 252/316; 427/222, 385

[56] References Cited

U.S. PATENT DOCUMENTS 3,978,261  8/1976  Ford et al. ........................... 428/327

Primary Examiner—William J. Van Balen
Attorney, Agent, or Firm—Mason, Fenwick & Lawrence

[57] ABSTRACT

Adhesive compositions comprising particles which have a core and a shell, the shell being rupturable to release the core material so that an adhesive having two distinct properties arising from the core and shell materials is obtained.

8 Claims, 1 Drawing Figure

POLYMER "CORE" PARTICLES

"CORE-SHELL" POLYMER PARTICLES

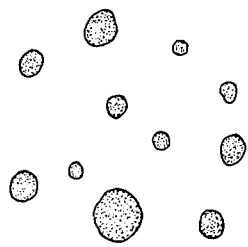
POLYMER "CORE" PARTICLES
Fig.1.
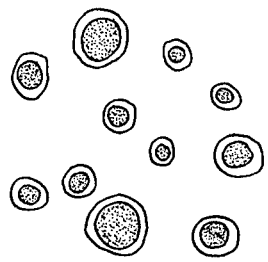
"CORE-SHELL" POLYMER PARTICLES

ADHESIVES

This invention relates to adhesive compositions.

FIG. 1 (the sole FIGURE) shows polymer "core" particles which are coated to form "core-shell" polymer particles.

More specifically, the invention relates to the use of "core-shell" polymers in adhesive compositions. A "core-shell" polymer has a core of a first polymeric material surrounded by one or more shells of a further polymeric material, the properties of the first and further polymeric materials being different in one or more respects. Core-shell polymers are described in the Journal of Macromolecular Science - Chem., A7(3) p.p. 623–646 (1973) by D. J. Williams et al.

We have found that adhesive compositions having core-shell polymers can confer considerable advantages over other types of adhesive compositions.

Delayed-tack adhesive compositions, as known in the art, are non-tacky at room temperatures, become adhesive or tacky by application of heat, and remain adhesive or tacky for an interval after heating is discontinued.

Such compositions have found widespread use as adhesive films and as coatings on substrates, such as paper, plastic sheet and metal foil, in the production of, for example, labels and tapes.

The adhesive composition is usually an intimate mixture of a thermoplastic polymer with a crystalline "plasticiser". The plasticiser is a material which, on heating, melts and dissolves the thermoplastic component to give a tacky, pressure-sensitive adhesive which stays tacky until the plasticiser recrystallises. The adhesive formulation is normally adjusted so that recrystallisation of the plasticiser takes place some time after the heat is removed.

A common previously-proposed commercial process for the production of a delayed-tack adhesive is to prepare an aqueous dispersion of the adhesive components. When such a dispersion is coated on a film or paper, the temperature of the air used to dry off the water must be kept low enough to prevent activation of the adhesive (i.e. melting of the plasticiser).

One way to make a delayed-tack adhesive very tacky and to make it remain tacky for as long as possible after activation is to choose a polymer which is soft and tacky itself. However, where the adhesive is to be coated on material, such as a film or paper, it is most important that the resulting adhesive coating should not exhibit "blocking" before activation. Blocking occurs when the adhesive adheres to the opposite surface of the coated material in a roll or in a stack of sheets. The components of the adhesive composition must therefore be hard enough to avoid blocking at normal handling temperatures.

Recently, a requirement for delayed-tack adhesives which work at very low temperatures has become more widespread. A typical application of this would be a label coated with a delayed-tack adhesive which is required to adhere well to a package at very low storage temperatures. At such temperatures, e.g. −20° to −40° C., previously-proposed activated delayed-tack adhesive films, although they do not recrystallise, do become very rigid and consequently the adhesive quality, or tack, of the layer is much reduced. Once again, the use of a soft and tacky polymer would be one solution, but, as explained above, this leads to blocking problems at normal temperatures.

Pressure-sensitive adhesive compositions are permanently tacky and find widespread use in adhesive films and coatings on substrates, such as paper, plastic films and metal foils, which may be used in the production of, for example, labels and tapes. In the case of, for example, label stock; blocking is prevented by protecting the adhesive composition with a release-coated backing paper.

A typical previously-proposed pressure-sensitive composition is a mixture of polymers to which is added various components, such as tackifiers, plasticisers and antioxidants. The most common methods of depositing a pressure-sensitive adhesive composition coating on a substrate are:

(a) From solvent,
(b) From hot melt mixture,
(c) From dispersion.

In the formulation of a pressure sensitive adhesive composition, the conflicting requirements which have to be balanced are tack and shear. Generally, the softer the polymer in the composition, the more readily it will adhere to surfaces; a composition which adheres readily is said to have high tack. The disadvantage of a composition having a soft and very tacky polymer is the fact that it has low shear strength; in other words, the cohesive strength of the adhesive composition is low. Low shear strength means that the composition splits or shears easily under stress or oozes under pressure.

The ideal pressure sensitive adhesive would have high tack and high cohesive strength, but it is well known in the art that these are two opposite properties and that it has hitherto been necessary to adjust the balance between them to the best compromise for the particular desired application.

In, for example, pressure-sensitive packaging tape, softness and tackiness are is required so that the adhesive composition wets out or "grabs" rough or dusty substrates. However, softness and high tack gives low shear which means that a lid, for example, held down by the tape could spring open some time after application or that the adhesive could gradually ooze at the edges of the coil of tape during storage, eventually making the coil unusable due to blocking at the edges.

An object of the present invention is to obviate or mitigate the above disadvantages.

According to the present invention there is provided a delayed-tack adhesive composition comprising particles which have a soft and tacky polymer core surrounded by a hard and non-tacky polymer shell in admixture with a solid modifier, such as a solid plasticiser.

The delayed-tack adhesive composition "can be prepared by a method", comprising forming, in a liquid, a dispersion of particles of the soft and tacky polymer, forming around each of the particles a shell of the hard and non-tacky polymer, providing in the dispersion particles of the plasticiser and removing the liquid at a temperature below the melting point of the plasticiser.

The hard and non-tacky polymer shell makes the particles resistant to blocking when incorporated in the unactivated adhesive composition. On activation the plasticiser dissolves the shell and releases the core polymer, whereby the advantages which are derived from the use of a soft and tacky polymer are obtained.

A typical delayed-tack composition in dispersion is in the form of a latex containing polymeric particles, the centres or cores of which consist predominantly of molecules of a polymer which is soft and tacky. An example of such a soft, tacky polymer is poly(2-ethylhexylacrylate). The outer layers or shells of the particles consist predominantly of molecules of a polymer which is hard and non-blocking. An example of such a polymer is polystyrene.

Apart from 2-ethylhexylacrylate, examples of monomers from which homopolymers or copolymers can be prepared for use as soft and tacky polymer cores are those from which addition polymers can be made, as for example $C_3$-$C_{10}$ alkyl acrylates, $C_5$-$C_{10}$ methacrylates, ethylene, propylene, butylene, butadiene, chloroprene, isoprene, and vinyl esters of saturated tertiary monocarboxylic acids and derivatives thereof. Such an acid is versactic acid. In addition, soft and tacky polymers can be obtained from many monomers if the molecular weight is sufficiently low; to obtain a soft and tacky core, therefore, it is advantageous to include in the dispersion a molecular weight moderator to produce a low molecular weight polymer when the core is formed in the dispersion by polymerisation of the monomers.

Apart from styrene, examples of monomers which can be used by themselves or as co-monomers to give hard and non-tacky polymer shells are those from which addition polymers can be made, as for example $C_1$-$C_3$ alkyl methacrylates, acrylonitrile, methacrylonitrile, vinyl chloride, vinylidene chloride, and vinyl acetate. Obviously, it is essential that the shell polymer should be sufficiently hard and non-tacky to be non-blocking, and this can be achieved by making the shell of a high-molecular weight polymer.

As the plasticiser in the composition of this invention, any of those used in conventional delayed-tack compositions can be used, the most common of these being dicyclohexylphthalate.

The production of a core-shell polymer latex involves the setting up of polymerisation reaction conditions such that initially a latex with particles of soft and tacky polymer are formed and then hard and non-tacky polymer is polymerised onto these particles. This is shown diagrammatically in FIG. 1.

In order to facilitate the formation of particles with a core-shell structure, two conditions should be optimised: (1) The soft and tacky polymer particle formation must be virtually complete after the monomer producing the core polymer has all reacted; this may be achieved by adding a micelle-forming emulsifier only during the polymerisation of monomer to form the core. Stabilising emulsifiers, which may be required to be added during the polymerisation of the shell monomer, on the other hand, should be of a type which is absorbed on the polymer particles, rather than forms micelles. (2) The monomer producing the shell should react only on the surface of the particle and not diffuse into the centre. This may be achieved by adding the monomer at such a rate during the polymerisation reaction that the rate of polymerisation is determined by the rate of monomer addition, so that there is insufficient time for the monomer to diffuse into the particles. In practice, it is probable that conditions (1) and (2) are not completely fulfilled, but the closer they are approached, the better will be the core-shell particle structure which is obtained.

Another important factor which must be considered is the stability of the latex dispersion. As is common with all polymer latices for commercial use, the latex must be stable enough to prevent a large amount of coagulum being formed during the polymerisation reaction and to enable it to be readily usable after the reaction, by, for example, being pumped or compounded with other ingredients.

An example of a polymerisation reaction which we have found to give a suitable core-shell polymer dispersion is given below.

|  | Parts |
|---|---|
| Initial Charge |  |
| Water | 200 |
| Sodium bicarbonate | 0.65 |
| Lankropol K.M.A. (a sodium dialkyl sulphosuccinamate in 60% aqueous solution) | 5.25 |
| Monomer 1 |  |
| 2-ethyl hexyl acrylate | 89 |
| Styrene | 5 |
| Monomer 2 |  |
| 2-ethyl hexyl acrylate | 25 |
| Styrene | 25 |
| Acrylic acid | 2 |
| Monomer 3 |  |
| 2-ethyl hexyl acrylate | 2 |
| Styrene | 50 |
| Acrylic acid | 2 |
| Initiator/Emulsifier Solution 1 |  |
| Water | 50 |
| Lankropol K.M.A. (a sodium dialkyl sulphosuccinamate in 60% aqueous solution) | 23.2 |
| Potassium persulphate | 0.4 |
| Initiator/Emulsifier Solution 2 |  |
| Water | 30 |
| Potassium persulphate | 0.2 |
| Ethylan H.A. (nonyl phenol polyglycol ether) | 2.0 |

The production procedure is as follows:
1. The initial charge is heated to 85° C. while stirring.
2. 10% of the initiator/emulsifier solution 1 is added.
3. Monomer 1 is added dropwise over a period of 2 hours. The rate is controlled so that the monomer reacts instantaneously, i.e. the reaction rate is controlled by the rate of monomer addition.
4. The remainder of the initiator/emulsifier solution 1 is added simultaneously with monomer 1 at a rate such that the total amount is added over a period of 3¼ hours, i.e. the total time for the addition of monomers 1 and 2.
5. The temperature is lowered to 70°–75° C. and monomer 2 is added over a period of 1¼ hours, again so that the monomer reacts immediately.
6. After the addition of monomer 2 is complete, the temperature is increased to 80°–85° C. for thirty minutes.
7. The temperature is lowered to 70°–75° C. Monomer 3 and initiator/emulsifier solution 2 are added over a period of 1¼ hours, such that monomer 3 reacts immediately.
8. After all monomer 3 has been added, the temperature is increased to 80°–85° C. and the reaction continued for one hour.

The reaction product is a stable polymer latex of 43% solids content which we shall denote "polymer latex A". In this, the polymer prepared from monomer 1 forms particle cores which have around them outermost shells of polymers prepared from monomer 3. An intermediate layer of polymer prepared from monomer 2 may be present in some of the particles.

Another example of a polymerisation reaction which we have found to give a suitable core-shell product is given below. This is given to illustrate the use of a molecular weight moderator to exercise control over the softness and tackiness of the core by controlling its molecular weight.

| | Parts |
|---|---|
| Initial Charge | |
| Water | 160 |
| Sodium bicarbonate | 0.65 |
| Monomer 1 | |
| 2-ethyl hexyl acrylate | 89 |
| Styrene | 5 |
| t-dodecylmercaptan (molecular weight moderator) | 0.5 |
| Monomer 2 | |
| 2-ethylhexylacrylate | 25 |
| Styrene | 25 |
| Acrylic acid | 2 |
| Monomer 3 | |
| 2-ethylhexylacrylate | 2 |
| Styrene | 50 |
| Acrylic acid | 2 |
| Initiator/emulsifier Solution 1 | |
| Water | 50 |
| Lankropol K.M.A. (a sodium dialkyl sulphosuccinamate 60% aqueous solution) | 23.2 |
| Potassium persulphate | 0.4 |
| Initiator/emulsifier Solution 2 | |
| Water | 30 |
| Potassium persulphate | 0.2 |
| Ethylan H.A. (nonyl phenol polyglycol ether) | 2.0 |

The production procedure is similar to that in the previous example.

The reaction product is a stable polymer emulsion of solids content 46.5% which we shall denote "polymer latex B".

A further method of producing a core-shell polymer latex is to use a commercial pressure-sensitive polymer latex as the core polymer and to polymerise a hard and non-tacky shell monomer onto the particles of this latex. In the example given below the commercial polymer was made even softer and tackier by the addition of a liquid plasticiser, tributyl citrate.

| | Parts |
|---|---|
| Initial Charge | |
| Water | 100 |
| Potassium persulphate | 0.2 |
| Vantac 343 | 270 |
| Tributyl citrate | 30.5 |
| Monomer | |
| Styrene | 80 |
| 2-ethyl hexyl acrylate | 8 |
| Acrylic acid | 2 |
| Initiator/Emulsifier solution | |
| Water | 40 |
| Ethylan H.A. (nonyl phenol polyglycol ether) | 12.5 |
| Potassium persulphate | 0.5 |

The production procedure is as follows:
1. The Vantac 343 and tributyl citrate of the initial charge are stirred together vigorously for 3-4 hours.
2. The water of the initial charge is heated to 80° C. and then the potassium persulphate is added, followed by the Vantac 343/tributyl citrate mixture.
3. The monomer is added dropwise over a period of 3 hours.
4. The initiator/emulsifier solution is added, separately but simultaneously, with the monomer over the same time period.
5. After the addition of monomer and initiator/emulsifier is complete the temperature is increased to 85°-90° C. for thirty minutes.

The reaction product is a stable polymer latex of 49.4% solids which we shall denote as "polymer latex C".

Core-shell polymer latices like A, B and C, can be prepared by methods similar to those given in these examples. It is, of course, necessary to choose emulsifiers suitable for the various monomers, but this is a standard procedure well known in the art of emulsion polymerisation.

The use of core-shell polymer latices in delayed-tack adhesive formulations allows very much more scope in the properties which can be achieved since it enables softer and tackier polymers to be incorporated without blocking problems.

Commercially, there are very many delayed-tack formulations available. Most manufacturers of delayed-tack label paper offer a range of grades, each being particularly suitable for specific applications. It is therefore impossible to give examples which illustrate every advantage to be gained by the use of these polymer latices in delayed-tack adhesives. We will choose for illustrations three areas where we have found these products to give particular advantage.

Conventional delayed-tack adhesives prepared by previously-proposed methods do not perform well at very low temperatures, particularly when compared with pressure-sensitive adhesives. This is exemplified by labels for film-wrapped articles stored at deep freeze temperatures of, for example, −40° C. Even when formulated to be as soft and tacky as possible, conventional delayed-tack adhesives become non-tacky at these temperatures and can be quite easily removed, whereas pressure-sensitive adhesives can be formulated to stay strong, soft, tacky and pliable because they do not have the constraint of the blocking-resistance requirement. The use of core-shell polymer emulsions enables the formulation of delayed-tack adhesives which give adhesive properties at low temperatures at least equivalent to those of specially-formulated pressure-sensitive adhesives.

EXAMPLE 1

The following delayed-tack formulation was provided:

| | | Parts |
|---|---|---|
| 1. | Water: | 41.2 |
| 2. | Dicyclohexylphthalate (modifier): | 40.2 |
| 3. | Polypale Ester 10: | 9.6 |
| 4. | Polymer latex A: | 38.0 |

Components 1, 2 and 3 were ground in a ball mill or pebble mill with a dispersing agent until a suitable particle size was obtained and then component 4 was added. The resulting aqueous dispersion was coated on normal label base paper in a manner known in the art and dried at a temperature below the melting point of the dicyclohexylphthalate. In this way the adhesive was not activated. The dry coating weight was 25 g.s.m.

The paper with the delayed-tack adhesive composition coating was compared with a conventional delayed-tack label paper specially formulated for low temperature performance.

The conventional deep freeze labels gave poor to fair adhesion with no fibre-tear, whereas the adhesive labels prepared by the method of this Example gave 20-100% fibre-tear.

A self-adhesive paper specially formulated for low temperature work gave approximately 50% fibre-tear under the same test conditions.

To test that the adhesive formulations had suitable blocking resistance properties before activation, samples of the coated paper were held in a press, adhesive side against non-adhesive side, at a pressure of 30 lb/in$^2$ for 2 hours at 30° C. and examined after cooling. There was no cling between the samples and it was concluded therefore that, under normal conditions of storage, no blocking would occur.

The use of polymer latex B instead of polymer latex A gives similar results.

EXAMPLE 2

Using polymer latex C the following formulation was found to give excellent deep-freeze adhesion and blocking resistance.

|    |                     | Parts |
|----|---------------------|-------|
| 1. | Water               | 40    |
| 2. | Dicyclohexylphthalate | 60    |
| 3. | Polymer latex C:    | 81    |

Components 1 and 2 were ground in a pebble or ball mill with dispersing agent according to the prior art and component 3 was added. The mix was coated on normal label base paper and dried without activating the adhesive. The coating weight was 30 g.s.m. Adhesion and blocking tests were carried out as described in Example 4. The adhesion at −40° C. was found to be superior to that of standard deep-freeze delayed-tack-adhesive-coated papers and the blocking resistance was satisfactory.

Another application where soft and tacky delayed-tack adhesives are required is when the adhesive is applied to a cold surface and a very good bond is required immediately. In these cases, special deep freeze grades have hitherto been used, and, while they give better results than normal grades, they are still not as good as specially-formulated pressure-sensitive adhesives. The use of compositions, such as 2, gives much superior performance, giving immediate fibre-tear in many cases. The poor performance of the conventional deep freeze grades is due to the cold surface making the adhesive become rigid and the superior performance of the compositions of Examples 1 and 2 is due to the presence of a core of polymeric material having improved softness and tackiness.

These Examples show how core-shell polymer latices can be used in delayed-tack adhesive compositions which have much better properties than previously-proposed delayed-tack compositions when used at low temperatures or on cold surfaces.

It has hitherto been normal practice for manufacturers of delayed-tack compositions for use on label paper to have a grade for general work and a low-temperature grade for deep freeze work. The deep freeze grades usually work well down to temperatures in the region of −10° C., but, as has already been pointed out, are much less effective at lower temperatures. To achieve the requisite adhesive softness and tackiness, normal deep freeze grades usually have a high plasticiser/resin to polymer ratio. This makes them unacceptable for general use because of dusting resulting from the low proportion of film-forming polymer present in the adhesive layer. A high plasticiser to polymer ratio also leads to difficulties due to the tendency of the plasticiser to crystallise more quickly than it would normally. This gives shorter term adhesion when stuck to film substrates.

The use of core-shell polymers enables the required softness and tackiness to be achieved without a high plasticiser/polymer ratio being used. This one composition can replace both the hitherto-used normal and deep freeze formulations.

EXAMPLE 3

The following formulation was provided:

|    |                       | Parts by weight |
|----|-----------------------|-----------------|
| 1. | Water:                | 20              |
| 2. | Dicyclohexylphthalate: | 30             |
| 3. | Polypale ester 10:    | 12              |
| 4. | Polymer latex B:      | 19.3            |

Components 1, 2 and 3 were ground in a pebble or ball mill with a dispersing agent, and then component 4 was added. The mix was coated on normal base paper and dried without activating the adhesive. The dry coating weight was 22 g.s.m. When the resulting delayed-tack-adhesive-coated paper was compared with a standard universal grade and a standard deep freeze grade under a range of adhesion test conditions, it was found to have properties similar to the properties of these grades combined.

When large delayed-tack-adhesive-coated labels are applied to rigid substrates, for example glass or plastic, blistering of the label after application has hitherto been a problem. This is due to moisture pick-up by the paper following moisture loss during activation, causing expansion. In order to overcome this defect, it has been normal practice to use a delayed-tack composition which is as tacky as possible. Once again, this can be done by increasing the amount of plasticiser/resin relative to the amount of polymer, but, as previously pointed out, one of the disadvantages is dusting of the adhesive. The use of core-shell polymers in the composition enables much improved dusting properties than are possible with conventional compositions.

EXAMPLE 4

The following formulation was provided:

|    |                              | Parts by weight |
|----|------------------------------|-----------------|
| 1. | Dicyclohexylphthalate (modifier): | 60         |
| 2. | Stabelite Ester 10:          | 6.5             |
| 3. | Water:                       | 46.5            |
| 4. | Polymer latex A:             | 28              |

Components 1, 2 and 3 were ground in a pebble or ball mill with a dispersing agent and then component 4 was added. The resulting dispersion was coated on normal label base paper and dried without activating the adhesive. The dry coating weight was 25 g.s.m. When this delayed-tack composition-coated paper was compared with a paper coated with a standard delayed-tack composition for blistering and dusting properties, it was found to be superior.

According to the present invention we also provide a pressure-sensitive adhesive composition comprising particles which have a core of a high-shear strength adhesive polymer surrounded by a shell of a tacky polymer. The pressure-sensitive adhesive composition can be prepared by forming in a liquid a dispersion of particles of high-shear-strength polymeric adhesive material, forming around each of the particles a shell of a tacky polymeric material and removing the liquid.

The use of core-shell polymers is a way of improving the tack/shear properties of pressure-sensitive adhesives. The core could, for example, be of a tough flexible polymer, such as polybutyl methacrylate, and the shell of a tacky pressure sensitive polymer, such as poly(2-ethylhexyl acrylate). The monomers or co-monomers for the preparation of polymers for the cores can further be selected, for example, from those which are used for the preparation of the shells in the delayed-tack adhesive compositions of this invention, and the monomers or co-monomers for the shells may be selected, for example, from those used for the preparation of the cores in the delayed-tack adhesive compositions of this invention.

EXAMPLE 5

An example of a polymerisation reaction which has been found to give a suitable core-shell pressure-sensitive polymer is given below:-

|  | Parts |
|---|---|
| Initial Charge | |
| Water | 200 |
| Sodium bicarbonate | 0.65 |
| Lankropol K.M.A. | 5.25 |
| Monomer 1 | |
| iso-butyl methacrylate | 94 |
| Monomer 2 | |
| 2-ethyl hexyl acrylate | 25 |
| Styrene | 25 |
| Acrylic acid | 2 |
| Monomer 3 | |
| 2-ethyl hexyl acrylate | 50 |
| Styrene | 2 |
| Acrylic acid | 2 |
| Initiator/emulsifier solution 1 | |
| Water | 50 |
| Lankropol K.M.A. | 23.2 |
| Potassium persulphate | 0.4 |
| Initiator/emulsifier solution 2 | |
| Water | 30 |
| Potassium persulphate | 0.2 |
| Ethylan HA | 2.0 |

The production procedure is similar to that given for the preparation of "polymer latex A" previously described. The reaction product is a stable polymer latex of 43% solids content which forms a pressure-sensitive adhesive composition.

EXAMPLE 6

A further example of a polymerisation reaction which would when used in pressure sensitive adhesive formulations, give a superior balance of tack and shear strength is as follows:-

|  | Parts |
|---|---|
| Initial Charge | |
| Water | 100 |
| Potassium persulphate | 0.2 |
| Vantac 694 (a pressure sensitive polymer emulsion containing a high shear strength polymer). | 270 |
| Monomer | |
| 2-ethyl hexyl acrylate | 70 |
| Vinyl acetate | 20 |
| Initiator/emulsifier solution | |
| Water | 40 |
| Ethylan HA | 12.5 |
| Potassium persulphate | 0.5 |

The production procedure is as follows:-

1. The water of the initial charge is heated to 80° C. and then the potassium persulphate is added, followed by the Vantac 694.
2. The monomer is added dropwise over a period of 3 hours.
3. The initiator/emulsifier solution is added, separately but simultaneously, with the monomer over the same time period.
4. After the addition of monomer and initiator/emulsifier is complete the temperature is increased to 85°–90° C. for thirty minutes.

The reaction product is a stable polymer latex of 49.4% solids which forms a pressure-sensitive adhesive composition.

What is claimed is:

1. A delayed-tack adhesive composition comprising core-shell polymers in combination with solid plasticizer means, the core-shell polymers having a soft and tacky polymeric core and a hard and non-tacky polymeric shell, and the solid plasticizer means being means, when melted, to dissolve the hard polymeric shell.
2. A composition according to claim 1 wherein the soft polymeric core comprises an addition polymer.
3. A composition according to claim 2 wherein the soft polymeric core comprises a low-molecular-weight homopolymer or copolymer of a monomer selected from the group consisting of alkyl acrylate wherein the alkyl has from 3 to 10 carbon atoms, alkyl methacrylate wherein the alkyl has from 5 to 10 carbon atoms, olefin having from 2 to 4 carbon atoms, butadiene, chloroprene, isoprene, and a vinyl ester of a saturated tertiary monocarboxylic acid or a derivative thereof.
4. A composition according to claim 1 wherein the soft polymeric core comprises low-molecular-weight polymer.
5. A composition according to claim 1 wherein the hard polymeric shell comprises an addition polymer.
6. A composition according to claim 5 wherein the hard polymeric shell comprises a high-molecular-weight homopolymer or copolymer of a monomer selected from the group consisting of alkyl methacrylate wherein the alkyl has from 1 to 3 carbon atoms, acrylonitrile, methacrylonitrile, vinyl chloride, vinylidine chloride, vinyl acetate, styrene and a derivative of one of these monomers.
7. A composition according to claim 1 wherein the hard polymeric core comprises high-molecular-weight polymer.
8. A substrate coated with a delayed-tack adhesive composition according to claim 1.

* * * * *